(12) United States Patent
Seksaria et al.

(10) Patent No.: US 6,464,240 B1
(45) Date of Patent: Oct. 15, 2002

(54) TRAILER HITCH

(75) Inventors: Dinesh C. Seksaria, Novi, MI (US); John W. Cobes, Lower Burrell, PA (US); Robert P. Evert, Allison Park, PA (US); Walter R. Reichelt, Bloomfield Hills, MI (US); Jeffrey M. Shoup, Delmont, PA (US); Kirit N. Shah, Monroeville, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/694,590

(22) Filed: Oct. 23, 2000

(51) Int. Cl.[7] .............................................. B60D 13/00
(52) U.S. Cl. ...................................... 280/495; 280/504
(58) Field of Search .............................. 280/491.5, 495, 280/500, 504; D12/162

(56) References Cited

U.S. PATENT DOCUMENTS

| | | | | |
|---|---|---|---|---|
| 2,584,366 A | * | 2/1952 | Perry | 280/500 |
| 3,578,358 A | | 5/1971 | Reynolds | 280/500 |
| 3,768,837 A | | 10/1973 | Reese | 280/495 |
| 3,774,952 A | | 11/1973 | Zorn | 293/69 R |
| 3,981,688 A | * | 9/1976 | Telang et al. | 29/156.4 |
| 4,032,170 A | | 6/1977 | Wood | 280/495 |
| 5,102,156 A | | 4/1992 | Fink et al. | 280/495 |
| 5,277,448 A | | 1/1994 | Colibert | 280/495 |
| 5,489,111 A | | 2/1996 | Collins | 280/495 |
| 5,507,515 A | | 4/1996 | Schellenberg et al. | 280/491.5 |
| 5,511,813 A | | 4/1996 | Kravitz | 280/495 |
| 5,620,198 A | | 4/1997 | Borchers | 280/507 |
| D379,343 S | * | 5/1997 | Shaw et al. | D12/162 |
| 5,833,254 A | * | 11/1998 | Bucho | 280/154 |
| 5,853,187 A | * | 12/1998 | Maier | 280/495 |
| D424,989 S | * | 5/2000 | McCoy et al. | D12/162 |
| D427,118 S | | 6/2000 | McCoy et al. | D12/162 |
| 6,095,126 A | * | 8/2000 | Kloft et al. | 123/668 |
| 6,113,171 A | * | 9/2000 | Stearns | 296/26.08 |
| 6,149,181 A | * | 11/2000 | Biederman | 280/500 |

* cited by examiner

*Primary Examiner*—Daniel G. DePumpo
(74) *Attorney, Agent, or Firm*—Julie W. Meder; David W. Pearce-Smith

(57) ABSTRACT

A vehicle trailer hitch including an aluminum tubular U-shaped strut and a cast aluminum receiver mounted thereto. Ends of the strut tube are flatted to form integral planar mounting flanges for mounting the hitch to a vehicle.

20 Claims, 6 Drawing Sheets

TRAILER HITCH

FIELD OF THE INVENTION

The present invention relates to vehicle trailer hitches, more particularly to a two component trailer hitch manufactured from aluminum.

BACKGROUND OF THE INVENTION

Many passenger vehicles, particularly trucks, vans and sport utility vehicles are used to tow a trailer. The trailer is attached to a towing vehicle via a trailer hitch. One common type of trailer hitch is a receiver trailer hitch which includes a generally rectangular shaped tubular receiver in an assembly fixed to the vehicle frame structure. A generally rectangular shaped tongue extending from the trailer is mounted inside the receiver. The trailer hitch communicates the pulling, turning and braking forces from the towing vehicle to the trailer. Trailer hitches must bear a significant load and are designed for both functionality and aesthetics. In view of the strength and safety requirements of trailer hitches, a conventional 10,000-pound capacity trailer hitch typically weighs about of 35 pounds.

These conventional devices are typically formed from steel and include assembly of numerous components which may number as high as eight or more and which are joined together via arc welding. These heavy trailer hitches are often difficult to manipulate when installing or removing from a vehicle. Moreover, the weight of the trailer hitch adds significantly to the vehicle weight, thus reducing the fuel efficiency of the towing vehicle.

Typical trailer hitches formed from steel and having multiple components are disclosed in U.S. Pat. Nos. 3,578,358; 4,032,170; 5,102,156; 5,511,813; 5,620,198 and 5,277,448. Common to the trailer hitches disclosed in each of these patents is a multi-piece structure having an overall U-shaped configuration which is bolted at least at the ends of the U-shaped structure to the towing vehicle. U.S. Pat. No. 5,489,111 discloses a hidden trailer hitch having a curved strut member with mounting flanges attached to the end of the curved structure. U.S. Pat. No. Des. 427,118 discloses a design of elliptical tubes for use in a trailer hitch.

A significant drawback to conventional trailer hitches is the sheer number of components of the trailer hitches. The number of components adds to the complexity in manufacturing and installing the trailer hitch as well as the overall weight of the trailer hitch.

Accordingly, a need remains for a simple, lightweight vehicle trailer hitch having a minimum number of components.

SUMMARY OF THE INVENTION

This need is met by the vehicle trailer hitch of the present invention which includes 1) a unitary strut having a pair of integrally formed mounting members positioned at the ends of the strut and 2) a unitary receiver fixed to the strut at a position between the ends of the strut. Preferably, the strut is a U-shaped tubular member manufactured from extruded aluminum alloy having a cross-sectional configuration of an oval or a football-shape, with the mounting members formed at the ends of the tube. The ends of the tube are flattened to provide substantially planar portions. One or more openings are defined in the planar portions for receiving a fastener therethrough to fix the tube to a vehicle. The receiver includes a cast aluminum body preferably welded to the strut. An opening defined in the strut is configured to receive one end of a trailer. The internal surfaces of the opening may be coated with a protective material such as steel.

The receiver further includes a bracket extending from the top of the receiver body. The bracket includes an arcuately shaped attachment surface which abuts the exterior surface of the tube. A support member extends from the bottom of the receiver body and includes an elongated support surface is disposed on an opposing side of the tube from the arcuately shaped attachment surface. A hanger may be fixed to the tube for supporting and mounting electrical cables thereto.

The present invention further includes a method of manufacturing a vehicle trailer hitch having the steps of providing a tube having a pair of ends, bending the tube into a U-shape, flattening the ends of the tube to form a pair of substantially planar portions, reforming a portion of the tube between the ends to mate with a trailer receiver and mounting a trailer receiver on the tube at a position between the ends. The step of providing a tube preferably includes extruding an aluminum alloy tube having an oval or football-shaped cross-sectional configuration. A portion of tube is reformed to achieve a cross-sectional configuration which mates with a surface of the receiver. The receiver preferably is manufactured from cast aluminum and is welded to the tube.

BRIEF DESCRIPTION OF THE DRAWINGS

A complete understanding of the invention will be obtained from the following description when taken in connection with the accompanying drawing figures wherein like reference characters identify like parts throughout.

DETAILED DESCRIPTION OF PREFERRED EMBODIMENTS

Figure 1:
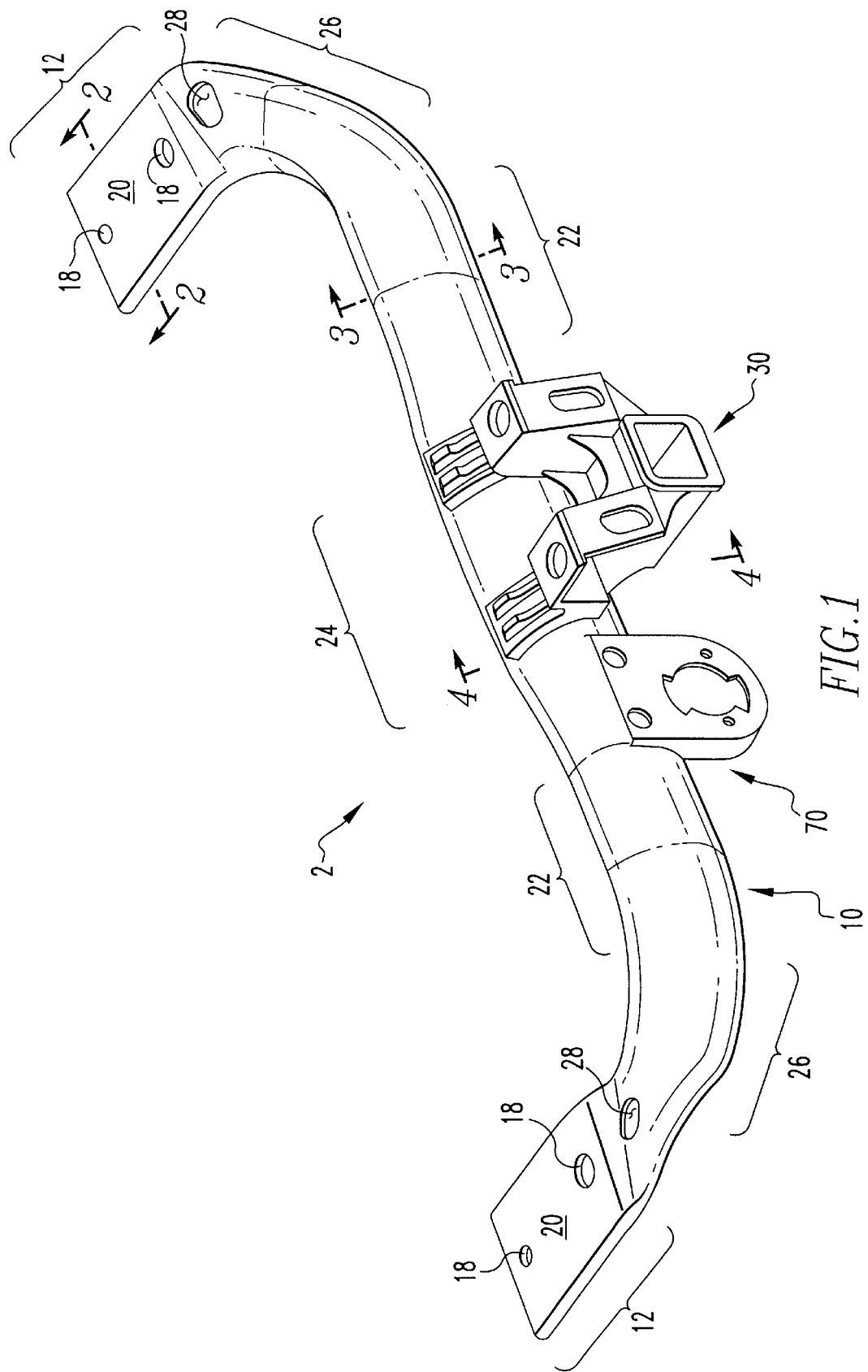
FIG. 1 is a perspective view of a vehicle trailer hitch made in accordance with the present invention including a tube, a receiver and a bracket.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The vehicle trailer hitch 2 of the present invention shown in FIG. 1 includes, in its most basic form, a U-shaped strut 10 and a receiver 30 mounted to the strut 10 with an optional hanger 70.

Figure 2:
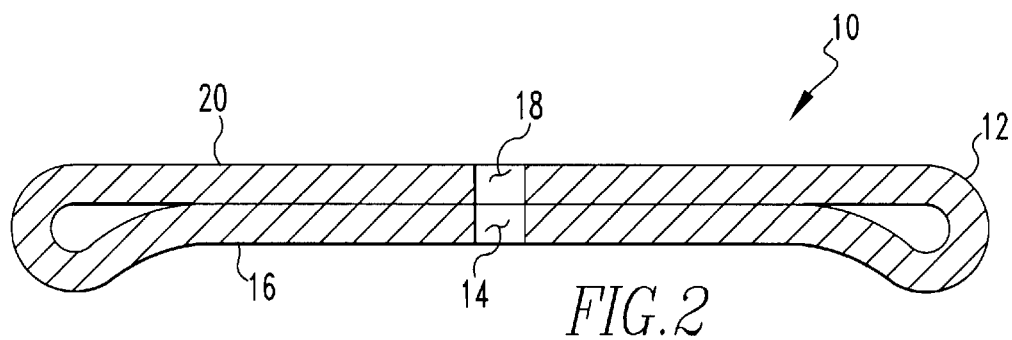
FIG. 2 is a cross-sectional view of the tube shown in FIG. 1 taken along line 2—2.

The strut 10 is preferably in the form of a tube having a cross-sectional configuration which varies long its length. The strut 10 preferably is extruded aluminum alloy of the Aluminum Association 6000 series, more preferably alloys 6082, 6063 or 6061, most preferably alloy 6082. The ends of the strut 10 are flattened, e.g. in a press, to form the cross-sectional configuration shown in FIG. 2, thereby creating integrally formed mounting members 12. The mounting members 12 may have other configurationsyet be integrally formed with the strut 10. The mounting members 12 each define at least one, preferably two, holes 14 in an underside 16 thereof and a corresponding number of holes 18 in an upper side 20. Preferably, the holes 14 and 18 have the same or similar dimensions, although one set of one holes 14 and 18 may have different dimensions from another set of holes 14 and 18. Each set of one hole 14 and one hole 18 is aligned to receive a fastener (not shown) therethrough. Preferably, a headed bolt or the like seats on the underside 16 of the mounting members 12 and the shank of the bolt extends through the holes 14 and 18 and into the underside of a vehicle (not shown) to mount the hitch 2 to the vehicle.

Figure 3:
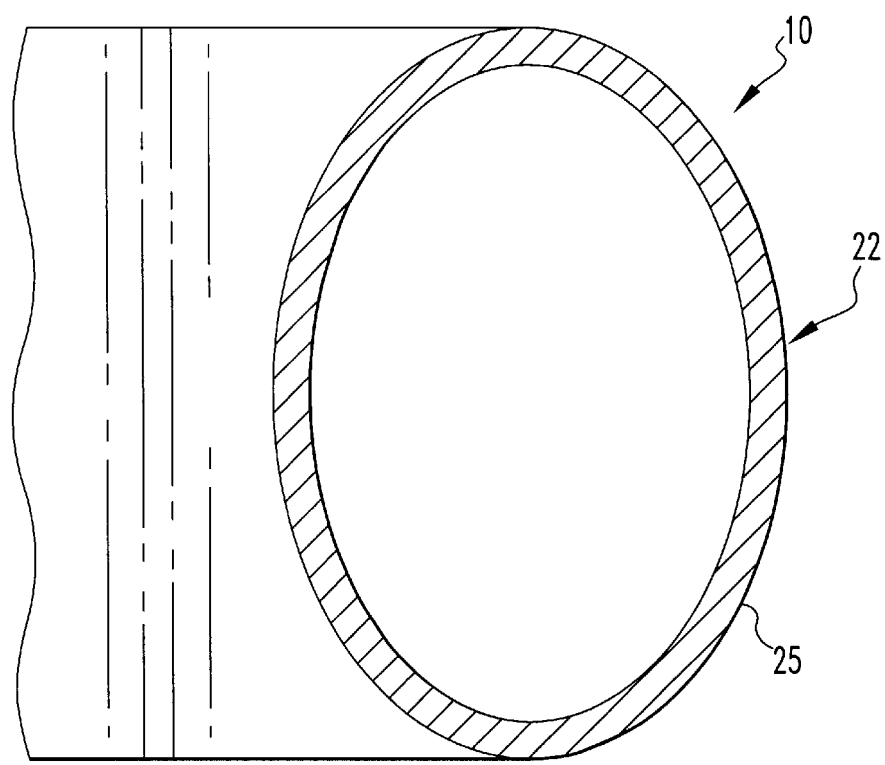
FIG. 3 is a cross-sectional view of the tube shown in FIG. 1 taken along line 3—3.
Figure 4:
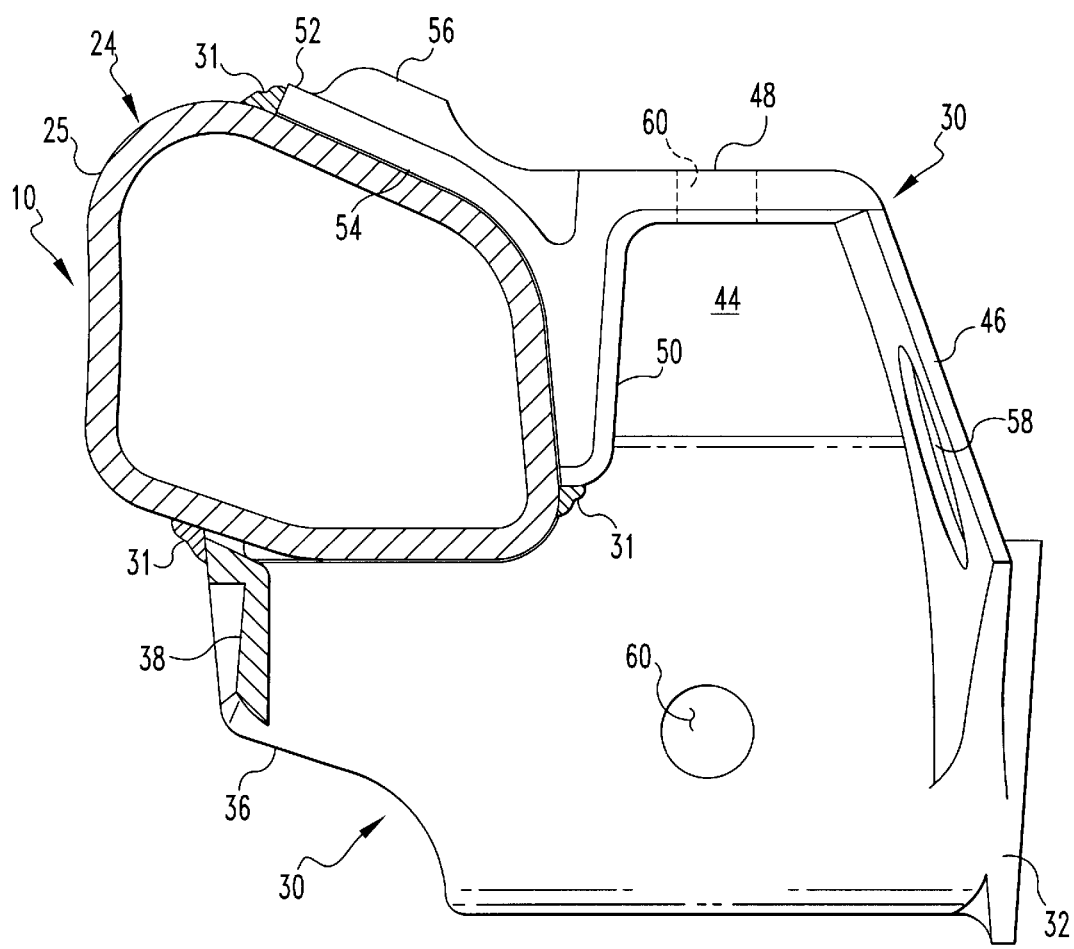
FIG. 4 is a cross-sectional view of the vehicle trailer hitch shown in FIG. 1 taken along line 4—4.
Figure 5:
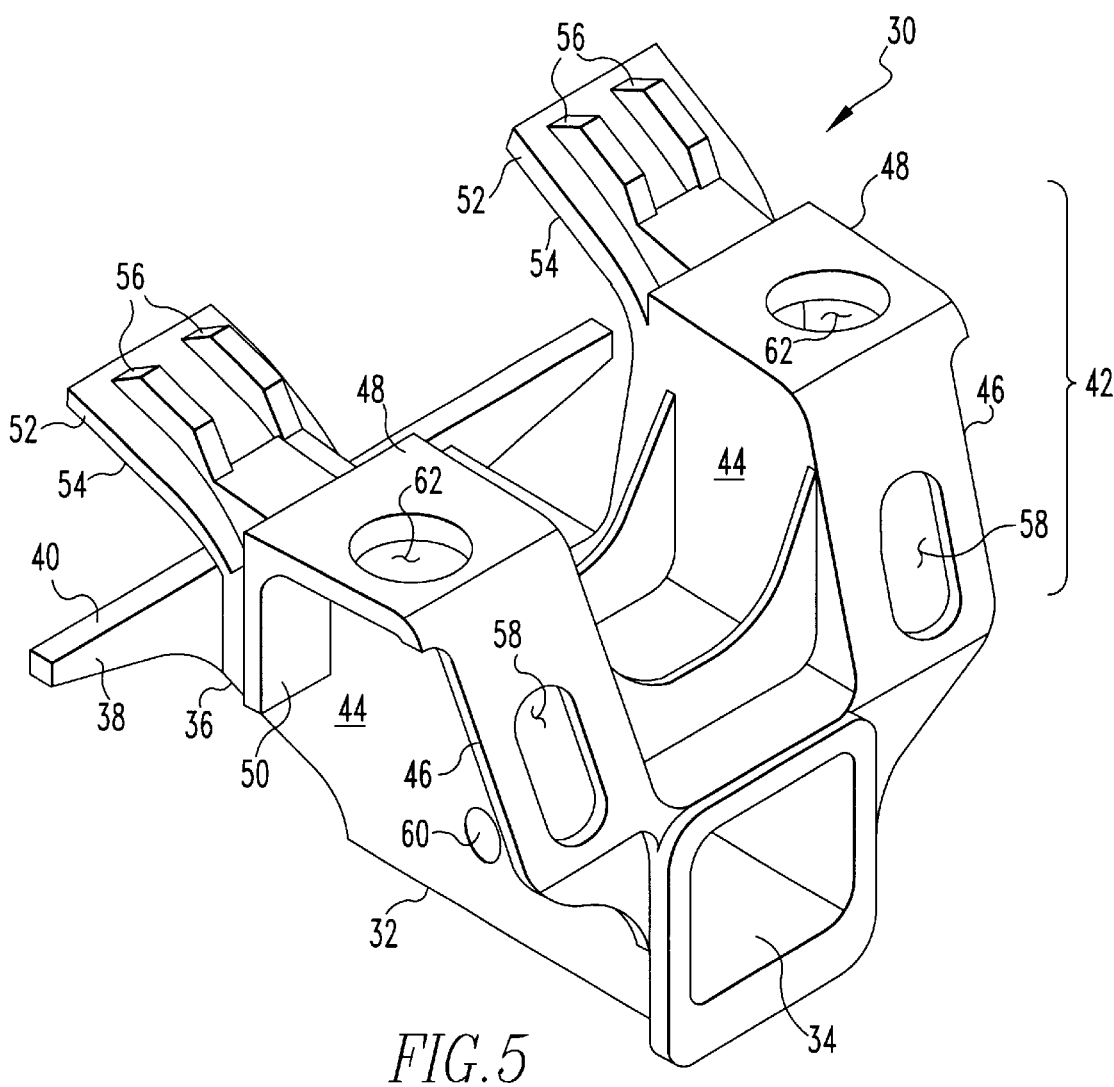
FIG. 5 is a perspective view of the receiver shown in FIG. 1.
Figure 6:
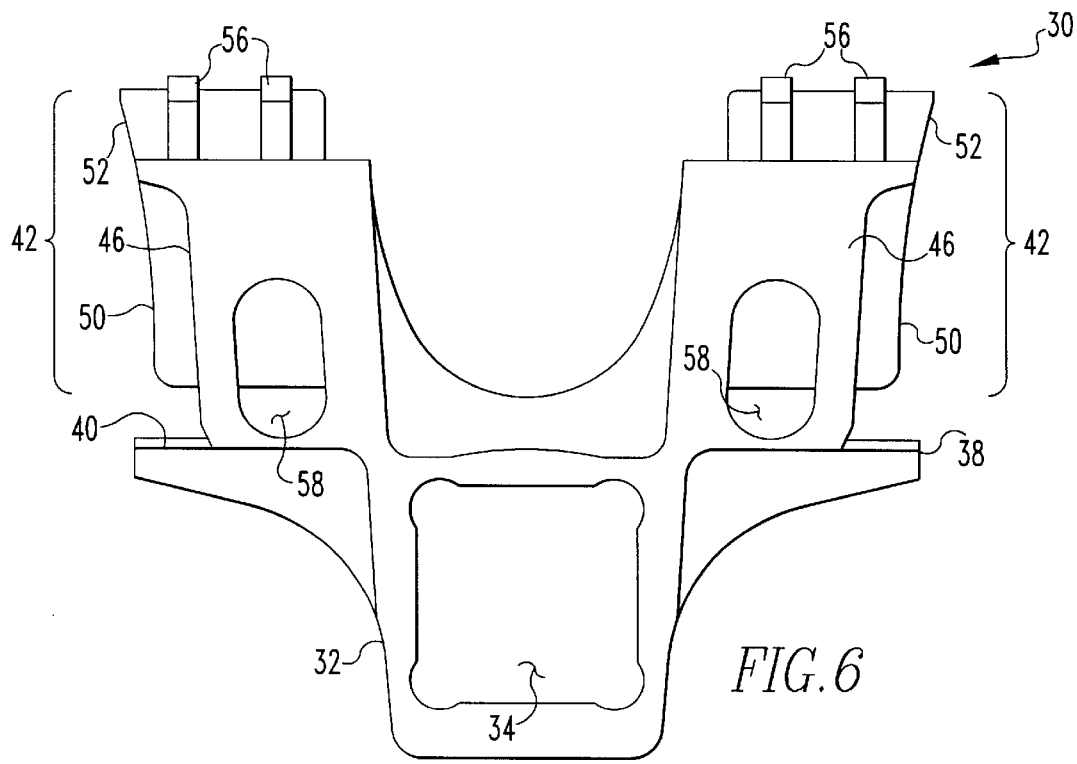
FIG. 6 is a front elevation view of the receiver shown in FIG. 5.
Figure 7:
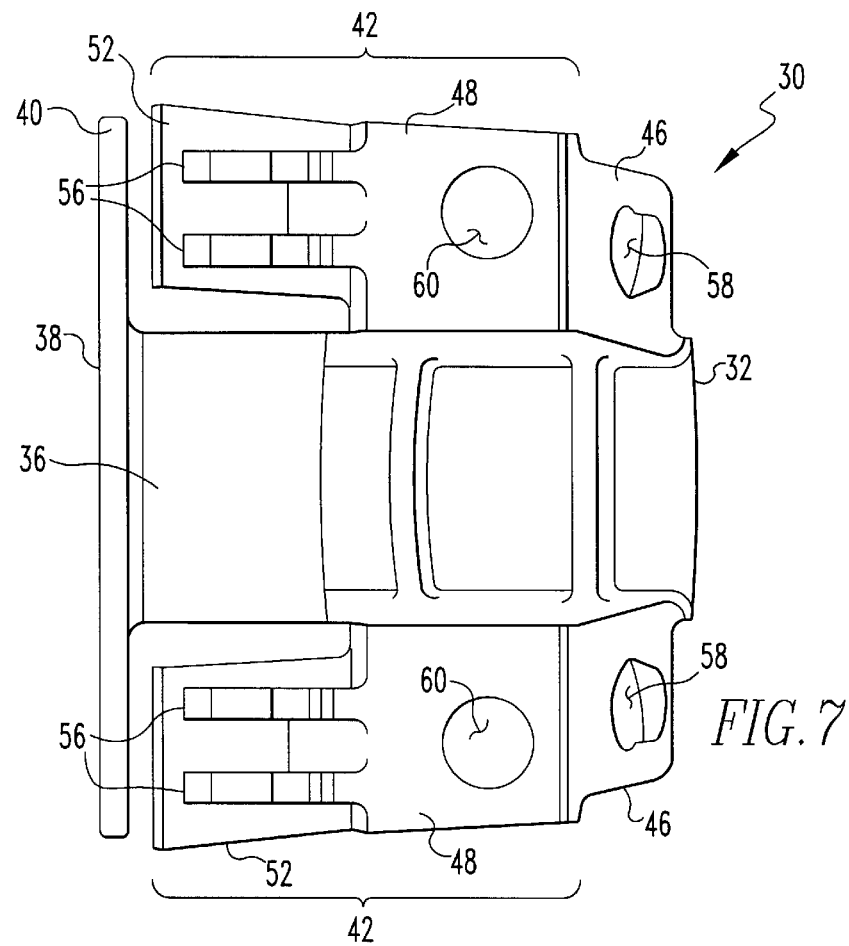
FIG. 7 is a top view of the receiver shown in FIG. 5.

An intermediate portion 22 of the strut 10 has a generally oval or football-shaped cross-sectional configuration as shown in FIG. 3, and a central portion 24 of the strut 10 has an irregular cross-sectional configuration as shown in FIG. 4 in the location of the receiver 30. Preferably, the strut 10 is extruded as a straight tube having a wall 25 and a football-shaped cross-sectional configuration. The ends are flattened to form the mounting members 12, and the tube is bent into a U-shape forming curved portions 26.

Referring to FIG. 1, the wall 25 of the strut 10 may further define one more openings 28 through a single thickness of the wall 25. The openings 28 are positioned and sized to accommodate downwardly extending structures on the underside of a vehicle which would otherwise interfere with the positioning of the strut 10 against the under side of the vehicle.

The wall 25 of the strut 10 is deformed from the extruded cross-sectional configuration as shown in FIG. 4 to permit mounting of the receiver 30 to the central portion 24 of the strut 10. The receiver 30 is preferably fixed to the central portion 24 of the strut 10 via welding as shown at reference numerals 31. The cross-sectional configuration of the central portion 24 of the strut 10 achieves an acceptable mating relationship between the strut 10 and the receiver 30.

The receiver 30 includes a unitary body 32 which defines a socket opening 34 for receiving the tongue member of a trailer (not shown). The receiver preferably is manufactured from cast aluminum of the Aluminum Association 3xx series, more preferably alloy A356. An inner surface of the socket opening 34 is preferably lined with a plasma sprayed composition such as stainless steel to provide wear resistance and corrosion resistance to the aluminum receiver 30. An arm 36 extends from the body 32 on an opposite side thereof from the socket opening 34. An elongated flange 38 extends from the arm 36 and includes a strut support surface 40. Preferably, the central portion 24 is welded to the strut support surface 40 of the receiver 30. One or more brackets 42 extend from an upper side of the receiver 30 and include a wall 44. A sloped ledge 46 extends from one side of the wall 44, a generally horizontal ledge 48 extends from a topside of the wall 44, and a generally vertical ledge 50 extends from a rear side of the wall 44. An arcuately shaped flange 52 extends from the vertical ledge 50 and includes a strut receiving surface 54 on an underside of the ledge 50 and at least one, preferably two, ribs 56 formed in an upper surface thereof. Each sloped ledge 46 defines an opening 58 for receiving safety chains and the like of a trailer (not shown), and each wall 44 defines an opening 60 for receiving a trailer hitch pin (not shown). A mounting hole 62 is defined in the horizontal ledge 48. A bolt (not shown) may extend from an underside of the ledge 48, through the hole 62 and into the underside of a vehicle (not shown) to further secure the hitch 2 to the vehicle.

Figure 9:
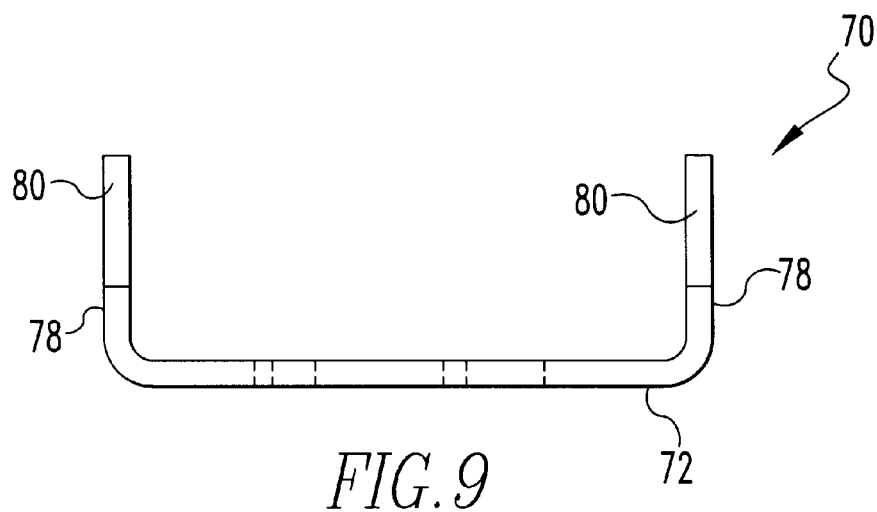
FIG. 9 is a top view of the bracket shown in FIG. 8.
Figure 8:
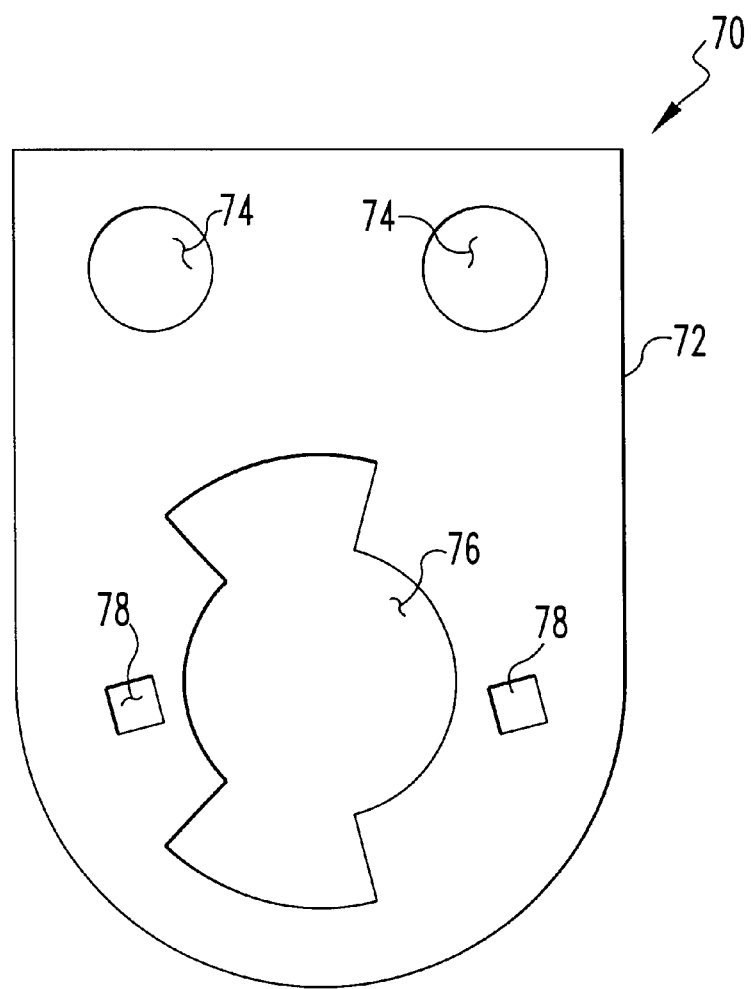
FIG. 8 is a front elevation of the bracket shown in FIG. 1.

Referring to FIGS. 1, 8 and 9, the trailer hitch 2 may include a hanger 70 fixed to the intermediate portion 22 of the strut 10. The hanger 70 includes a planar member 72 defining one or more first openings 74 for providing access to weld the hanger 70 to the strut 10. A second opening 76 and third openings 78 defined in the planar member 72 are sized and configured to receive electrical connections and/or cables between the vehicle and the trailer. A pair of side support members 78 are integrally formed with the planar member 72 and have curved surfaces 80 which mate with the strut 10.

Having described the presently preferred embodiments, it is to be understood that the invention may be otherwise embodied within the scope of the appended claims.

What is claimed is:

1. A vehicle trailer hitch comprising:

a one-piece U-shaped extruded aluminum alloy strut lying in a substantially horizontal plane and having a rounded, annular cross-section, said rounded annular cross-section of said strut tapering to form a pair of substantially planar, integrally extruded horizontally extending mounting members positioned at the ends of said strut, said mounting members being configured to mount said strut to a vehicle underside; and a unitary receiver fixed to a surface of said strut at a position between said mounting members, said receiver defining an opening for receiving one end of a vehicle trailer.

2. The vehicle trailer hitch of claim 1 wherein said strut comprises a tube, each said mounting member comprising an end of said tube, each said end being flattened to provide said substantially planar members.

3. The vehicle trailer hitch of claim 2 wherein each said planar portion defines an opening for receiving a fastener therethrough to mount said tube on an underside of a vehicle.

4. The vehicle trailer hitch of claim 2 wherein said tube includes an intermediate portion having an oval cross-sectional configuration.

5. The vehicle trailer hitch of claim 1 wherein said receiver comprises an aluminum alloy.

6. The vehicle trailer hitch of claim 5 wherein an interior surface of said opening of said receiver is coated with a protective material.

7. The vehicle trailer hitch of claim 6 wherein said material comprises steel.

8. The vehicle trailer hitch of claim 2 wherein said receiver comprises a body and a bracket extending from said body, said bracket having an arcuately-shaped attachment surface abutting an exterior surface of said tube.

9. The vehicle trailer hitch of claim 8 wherein said receiver comprises a support member supporting said tube extending from said body and disposed on an opposing side of said tube from said arcuately-shaped attachment surface.

10. The vehicle trailer hitch of claim 9 wherein said receiver is welded to said tube.

11. The vehicle trailer hitch of claim 2 further comprising a hanger member fixed to said tube, said hanger member being configured to mounting electrical cables thereto.

12. A vehicle trailer hitch comprising:

a one-piece U-shaped extruded aluminum alloy strut lying in a substantially horizontal plane and having a wall with a varying annular cross-section and a pair of integrally extruded mounting members positioned at the ends of said strut, said mounting members being configured to mount said strut to a vehicle underside; and a unitary receiver fixed to said wall at a position between said mounting members, said wall being deformed at said position to permit mounting said receiver thereto and said receiver defining an opening for receiving one end of a vehicle trailer.

13. The vehicle trailer hitch of claim 12 wherein said rounded, annular cross-section is oval.

14. The vehicle trailer hitch of claim 12 wherein said strut comprises an aluminum alloy.

15. The vehicle trailer hitch of claim 14 wherein said receiver comprises an aluminum alloy.

16. The vehicle trailer hitch of claim 15 wherein an interior surface of said opening of said receiver is coated with a protective material.

17. The vehicle trailer hitch of claim 16 wherein said material comprises steel.

18. The vehicle trailer hitch of claim 12 wherein said receiver comprises a body and a bracket extending from said body, said bracket having an arcuately-shaped attachment surface abutting said deformed wall.

19. The vehicle trailer hitch of claim 18 wherein said receiver comprises a support member supporting said tube extending from said body and disposed on an opposing side of said tube from said arcuately-shaped attachment surface.

20. The vehicle trailer hitch of claim 19 wherein said receiver is welded to said tube.

* * * * *